United States Patent [19]

Wang

[11] Patent Number: 4,968,769

[45] Date of Patent: Nov. 6, 1990

[54] NOVEL POLYARYL ETHERS

[75] Inventor: Pen-Chung Wang, Houston, Tex.

[73] Assignee: Shell Oil Company, Houston, Tex.

[21] Appl. No.: 428,563

[22] Filed: Oct. 30, 1989

Related U.S. Application Data

[63] Continuation-in-part of Ser. No. 314,516, Feb. 23, 1989, abandoned.

[51] Int. Cl.$^5$ .................... C08G 8/02; C08G 65/38; C08G 65/40
[52] U.S. Cl. .................... 528/210; 528/125; 528/128; 528/211; 528/218
[58] Field of Search ............... 528/210, 125, 128, 211, 528/218

[56] References Cited

U.S. PATENT DOCUMENTS

| | | | |
|---|---|---|---|
| 3,730,946 | 5/1973 | Heath et al. | 528/176 |
| 4,640,974 | 2/1987 | Matsuo et al. | 528/211 |
| 4,888,408 | 12/1989 | Wang | 528/96 |

*Primary Examiner*—Harold D. Anderson
*Assistant Examiner*—T. Mosley

[57] ABSTRACT

Novel linear, alternating polyarylene ethers are characterized by moieties derived from a halo-substituted arylene compound having an electron-withdrawing substituent on each of from 1 to 2 aromatic rings alternating with moieties of a 1,6-diaza[4.4]spirodilactam compound having oxyphenyl substituents on each spiro ring ntrogen atom and, optionally, moieties of a di(4-oxyphenyl) compound.

33 Claims, No Drawings

NOVEL POLYARYL ETHERS

CROSS-REFERENCE TO RELATED APPLICATIONS

This application is a continuation-in-part of Ser. No. 314,516, filed Feb. 23, 1989, now abandoned.

FIELD OF THE INVENTION

This invention relates to a polymeric polyarylene ether having alternating moieties of two differing cyclic structures. More particularly, the invention relates to a linear alternating polymer incorporating moieties of a 1,6-diaza[4.4]spirodilactam compound, moieties of an arylene compound substituted with at least one electron withdrawing group and, optionally, moieties of a di(hydroxyphenyl) compound.

BACKGROUND OF THE INVENTION

Polyarylene ethers are well known class of engineering thermoplastics. The aromatic portion of the polyarylene ether is thought to contribute to thermal stability and good mechanical properties of the polymer and the ether linkages are considered to facilitate polymer processing while maintaining oxidative and thermal stability.

Polyarylene ethers having an aryl moiety substituted with an electron-withdrawing group are illustrated by the known class of polycyanoaryl ethers represented by the general formula

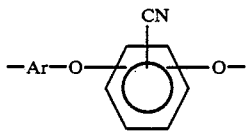

wherein the term Ar represents a variety of arylene species of from 1 to 2 aromatic rings. The cyano group on an aromatic ring appears to promote adhesion of the polymer to many substrates, possibly through polar interaction with other functional groups, and it serves as a potential site for polymer crosslinking. Heath et al, U.S. Pat. No. 3,730,946, discloses polycyano ethers of the above formula wherein Ar is the residue of 2,2-di(4-hydroxyphenyl)propane. Matsuo et al, U.S. Pat. No. 4,640,974, disclose polycyanoaryl ethers of the above formula wherein Ar is a single ring, i.e., phenylene, or has two rings which are fused as in naphthalene or are connected by a valence bond or one of a number of connecting groups.

Such polyaryl ethers have good mechanical properties and a good heat resistance depending in part upon the nature of the Ar group and the nature of the cyano or other electron withdrawing group. The glass transition temperatures of many polycyanoaryl ethers is relatively high with values in the range of from about 150° C. to about 230° C. depending upon the particular Ar group present. It would be of advantage to provide novel polyaryl ethers with even more improved properties and particularly with high glass transition temperatures.

SUMMARY OF THE INVENTION

The present invention provides a novel class of polyaryl ethers having a plurality of types of cyclic structure within the polymer chain. More particularly, the invention relates to a linear alternating polymer wherein arylene moieties having electron-withdrawing substituents alternate with moieities derived from a 1,6-diaza[4.4]spirodilactam compound having hydroxyaryl-containing substituents on the spiro ring nitrogen atoms and, optionally, moieties derived from a di(hydroxyphenyl) compound.

DESCRIPTION OF THE INVENTION

The novel polymers of the invention are most conveniently produced by reaction of a salt, particularly an alkali metal salt, of the hydroxyaryl-substituted 1,6-diaza[4.4]spirodilactam compound and, if present, the di(hydroxyphenyl) compound, with a halo-substituted arylene compound having at least one electron-withdrawing group as a substituent on an aromatic ring. Reaction serves to produce a linear alternating polymer wherein moieties derived from the halo-substituted arylene compound alternate with moieties of an oxyaryl-substituted spirodilactam compound and, optionally, moieties of a di(oxyphenyl) compound.

The spirodilactam moieties which are present in the polymers of the invention are derived by loss of acidic hydrogen atoms from a 1,6-diazaspiro[4.4]nonane-2,7-dione compound which is substituted on each spiro ring nitrogen atom with a hydroxyaryl-containing substituent. One class of such spirodilactams has up to 60 carbon atoms inclusive and is represented by the formula

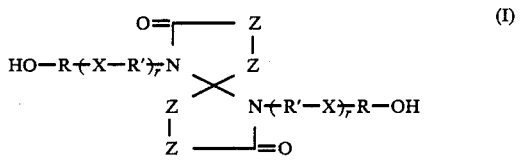

wherein Z independently is >C(Z')$_2$ in which Z' independently is hydrogen, lower alkyl of up to 4 carbon atoms inclusive, preferably methyl, or halo, preferably the lower halogens fluoro or chloro, or aryl, preferably phenyl, or Z is such that two adjacent Z moieties taken together form a ring system Z" of from 5 to 7 ring atoms, up to two of which are heteroatoms selected from nitrogen, oxygen or sulfur, with the remainder of the ring atoms being carbon atoms, there being up to 15 carbon atoms in each Z", two of which form a bridge between the carbon atoms connected by the adjacent Z moieties. In formula I, R independently is aromatic of up to 15 carbon atoms and up to 2 aromatic rings, inclusive, R' is R or an aliphatic group of up to 10 carbon atoms inclusive, r is 0 or 1 and X is a direct valence bond, alkylene of up to 8 carbon atoms inclusive, oxy, thio, sulfonyl, carbonyl, dioxyphenylene, 2,2-di(oxyphenyl)propane, di(oxyphenyl) sulfone or dioxydiphenylene. Each of R and R' is hydrocarbyl containing only atoms of carbon and hydrogen or is substituted hydrocarbyl containing additional atoms present as inert, monovalent carbon atom substituents such as halo, preferably the middle halogens, chloro or bromo.

Spirodilactam compounds of a considerable variety of structures are therefore suitably employed as the source of the spirodilactam moieties in the polymer of the invention. In the embodiment wherein the Z moieties of the compounds of formula I are not part of a fused ring substituent and are therefore acyclic, i.e, Z is >C(Z')$_2$, the hydroxyaryl-substituted spirodilactams are illustrated by 1,6-di(4-hydroxyphenyl)-1,6-diazaspiro-[4.4]nonane-2,7-dione, 1,6-di(3-hydroxyphenyl)-

1,6-diazaspiro[4.4]nonane-2,7-dione, 1,6-di(3-hydroxy-4-chlorophenyl)-3,8-dimethyl-1,6-diazaspiro-[4.4]nonane-2,7dione, 1,6-di[4-(4-hydroxybenzoyl)phenyl-1,6-diazaspiro-[4.4]nonane-2,7-dione, 1,6-di(4-hydroxyphenyl)-3,3,4,4,8,9,9-octamethyl-1,6-diazaspiro[4.4-]nonane-2,7-dione, 1,6-di[4-(3'-hydroxybiphenyl)]-3,3-dimethyl-1,6-diazaspiro]4.4[nonane-2,7-dione, 1,6-di[2-(4-hydroxyphenyl)propyl)]1,6-diazaspiro-8 4.4]nonane-2,7-dione, 1,6-di[4-(4-hydroxyphenylisopropyl)phenyl]-1,6-diazaspiro[4.4]nonane-2,7-dione and 1,6-di(3-hydroxy-phenyl-3,4,8,9-tetrafluoro-1,6-diazaspiro[4.4-]nonane-2,7-dione. In the embodiment wherein adjacent Z moieties of each spiro ring form a cyclic substituent fused to the spiro ring, i.e., adjacent Z moieties are Z", illustrative spirodilactams include 1,6-di(4-hydroxyphenyl)-3,4,8,9-dibenzo-1,6-diazaspiro[4.4]nonane-2,7-dione, 1,6di[4-(4-hydroxyphenyloxy)phenyl)]-3,4,8,9-di(pyrido)-1,6-diazaspiro[4.4]nonane-2,7-dione and 1,6-di[4-(4-hydroxyphenylthio)phenyl]-3,4,8,9-di(cyclopentano)-1,6-diazaspiro[4.4]nonane-2,7dione. Also suitable are those spirodilactams wherein one spiro ring has a fused cyclic substituent and the other spiro ring is free of fused cyclic substituents, e.g., 1,6-di(4-hydroxyphenyl)3,4-benzo-8-methyl-1,6-diazaspiro[4.4]nonane-2,7-dione and 1,6-di[l1-(4-hydoxynaphthyl)]-3,4-cyclopentano-1,6-diazaspiro[4.4]nonane-2,7-dione.

In general, the compounds of the above formula I wherein both R and R' are aromatic and hydrocarbyl are preferred, especially such compounds wherein each r is 0. The class of 1,6-di(hydroxyphenyl)spirodilactams are particularly preferred, especially the 1,6-di(4-hydroxyphenyl) spirodilactams Within the spirodilactam portion of the molecule, the spirodilactams wherein both rings are free of fused cyclic substituents or the compounds wherein both spiro rings contain a fused cyclic substituent are preferred. The compound 1,6-di(4-hydroxyphenyl)-1,6-diazaspiro[4.4]nonane-2,7-dione is a particularly preferred member of the former class and 1,6-di(4-hydroxyphenyl)-3,4,8,9-dibenzo-1,6-diazaspiro[4.4]nonane-2,7-dione is a particularly preferred member of the latter class.

The hydroxyaryl-substituted spirodilactams of the above formula I are compounds which are described in more detail and claimed in copending U.S. patent application Ser. No. 245,618, filed Sept. 16, 1988. The general method of production, also described in this copending application as well as copending U.S. patent applications Ser. No. 172,000 filed Mar. 23, 1988, and Ser. No. 172,052, filed Mar. 22, 1988, each of which is incorporated herein by reference, is by reaction of at least one hydroxy-containing primary amino compound and a spirodilactam precursor. In terms of the spirodilactams of formula I, the hydroxy-containing primary amino compound is represented by the formula

HO—R—(X—R')ᵣ—NH₂ (II)

wherein R, R', r and X have the previously stated significance. The spirodilactam precursor is a 4-oxoheptanedioic acid compound or a 1,6-dioxaspiro[4.4]nonane-2,7-dione. In terms of the spirodilactams of formula I, the 4-oxoheptanedioic acid compounds are represented by the formula

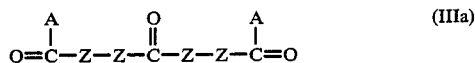

wherein Z has the previously stated meaning and A independently is hydroxy, lower alkoxy of up to 4 carbon atoms inclusive, or halo, preferably the middle halogens chloro or bromo. The spirodilactone employed as a spirodilactam precursor, in terms of the spirodilactams of formula I, is represented by the formula

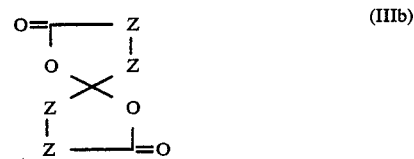

wherein Z has the previously stated meaning.

The acyclic 4-oxoheptanedioic acid compounds are known compounds or are produced by known methods, but certain of the esters of formula IIIa, i.e., the compounds wherein A is alkoxy, are conveniently produced by the process described and claimed in copending U.S. patent application Ser. No. 171,999, filed Mar. 23, 1988, now U.S. Pat. No. 4,800,231. Interconversion of the acids, esters or acid halides of formula IIIa is by conventional methods. The production of 4-oxoheptanedioic acid compounds which contain cyclic substituents is by process of Cava et al, J. Am. Chem. Soc., 20; 6022 (1955). The synthesis of the spirodilactones of formula IIIb is by the process of Pariza et al, Synthetic Communications, Vol. 13 (3), pp. 243–254 (1983) or by the process of Conover et al, U.S. Pat. No. 1,999,181.

The hydroxy-containing primary amino compound and the spirodilactam precursor react in a molar ratio of 2:1 although, in practice, reactant ratios from about 8:1 to about 1:1.5 are satisfactory. Reactant ratios that are substantially stoichiometric are preferred. Reaction is conducted in a liquid phase in the presence of an inert reaction diluent such as an N-alkylamide, e.g., N,N-dimethylacetamide, N,N-dimethylformamide, or N methyl-2-pyrrolidone. Reaction takes place under reaction conditions at at elevated temperature, typically from about 80° C. to about 250° C. The reaction pressure should be sufficient to maintain the reaction mixture in a liquid phase. Such pressures are up to about 20atmospheres. Subsequent to reaction the spirodilactam product of formula I is recovered from the product mixture by conventional methods such as solvent removal, precipitation and chromatographic separation. Recovery of the spirodilactam product is not required, however, and particularly in cases where substantially stoichiometric quantities of reactants were employed the spirodilactam may be reacted further in situ without isolation.

The halo-substituted arylene compound having at least one monovalent electron-withdrawing group as an aromatic ring carbon atom substituent is an arylene compound of from 1 to 2 aromatic rings, inclusive, wherein each of such rings has an electron-withdrawing substituent. When two aromatic rings are present in the halo-substituted arylene compound, the rings are fused, as in a naphthalene ring system, or the rings are joined by a link of variable composition. The compound has two halo substituents, on the terminal aromatic rings of more than one ring is present, and on the same aromatic ring of the halo-substituted arylene compound has a single aromatic ring, i.e., the arylene compound is a phenylene compound. One class of such arylene compounds has up to 30 carbon atoms and is represented by the formula

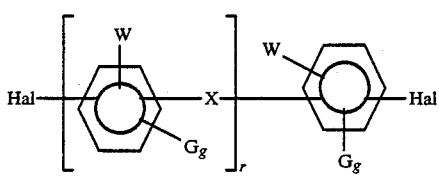

wherein X and r have the previously stated meaning, G is lower alkyl, g is 0, 1 or 2 and Hal is halogen, i.e., fluoro, chloro, bromo or iodo, but preferably is lower halogen. The term W is an electron-withdrawing group, that is, a group which when substituted on an aromatic ring is thought to be ring-deactivating and generally meta-directing as regards further ring substitution of the aromatic ring. Preferred W groups are cyano, nitro, nitroso and trifluoromethyl, most preferably cyano. The substitution of linking moieties or halo substituents on the ring or rings of the halo-substituted arylene compound is variable and is suitably ortho, meta or para, relative to the electron-withdrawing group, or mixtures thereof. The preferred substitution on the compounds of formula IV is such that each halo-substituent or linking group is attached to a carbon atom which is ortho to the ring carbon atom on which the group W is substituted. Illustrative of the arylene compounds of a least one electron-withdrawing group are 2,6-dichlorobenzonitrile, 2,4-dichlorobenzonitrile, 3,5-dibromobenzonitrile, 2,6-dichloro-4-tolunitrile, 2-chloro-6-fluoronitrosobenzene, 2,6-dichloronitrobenzene, di(4-chloro-2-nitrophenyl) ether, 3,3'-dibromo4,4'-dinitrobiphenyl, di(4-cyano-3-iodophenyl) ketone, 4-fluoro-3-(trifluoromethyl)phenyl 3-chloro-4-cyanophenyl sulfone, 2,2-di[4-(3-chloro-4-cyanophenyloxy)phenyl]propane and di(4-bromo-2-nitrophenyl) sulfide. Of these arylene compounds, those compounds of the above formula IV wherein r is 0 are preferred and especially preferred are the 2,6-dihalobenzonitriles, particularly 2,6- dichlorobenzonitrile. These arylene compounds of at least one electron withdrawing substituent are known compounds or are produced by known methods.

The source of the optional third monomer of the polymers of the invention is a 2,2-di(hydroxyphenyl) compound of up to 30 carbon atoms and up to 2 aromatic rings, inclusive. Illustrative of such compounds are dihydroxybenzenes such as hydroquinone and resorcinol, dihydroxynaphthalenes such as 1,5-dihydroxynaphthalene, 2,7-dihydroxynaphthalene and 1,6-dihydroxynaphthalene as well as the compounds represented by the formula

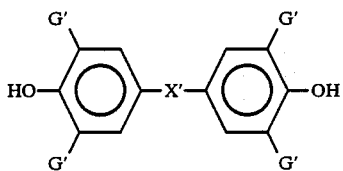

wherein G' independently is hydrogen, lower alkyl or halogen, preferably middle halogen and X' is a direct valence bond, alkylene of up to 8 carbon atoms inclusive, oxy, thio, sulfonyl or carbonyl. Illustrative of the compounds of formula V are 2,2-di(4-hydroxyphenyl)-propane, di(4-hydroxy-3methylphenyl)methane, di(4-hydroxy-3,5-dibromophenyl)ketone, 2-(4-hydroxyphenyl)-2-(4-hydroxy-3-bromophenyl)propane, 2-(4-hydroxyphenyl-3,5-dibromophenyl)-2-(4-hydroxy-3-methylphenyl) ether, di(4-hydroxyphenyl) sulfone, di(4-hydroxyphenyl)methane, 4,4'-dihydroxybiphenyl, or 2,2-di(4-hydroxy-3,5-dibromophenyl)propane. The compound 2,2-di(4-hydroxyphenyl) propane, also known as bisphenol A or BPA, is a preferred member of the class of compounds of formula V.

The process of producing the novel polymers of the invention comprises the reaction of the halo-substituted arylene reactant with the alkali metal salt of the hydroxyaryl-substituted spirodilactam compound and, if third monomer is present, the alkali metal salt of the di(hydroxyphenyl) compound. The product is an alternating copolymer of moieties derived from the halo-substituted arylene reactant and the hydroxyaryl-substituted spirodilactam compound whenever third monomer is not present. In the modification where third monomer is present, the product is a terpolymer wherein a moiety derived from the halo-substituted arylene reactant alternates with either a moiety derived from the substituted spirodilactam or a moiety derived from the di(hydroxyphenyl) compound.

Polymerization is typically preceded by the formation of the alkali metal salt of the hydroxyaryl-substituted spirodilactam compound and, if present, the di(hydroxyphenyl)propane compound. Although the lithium, sodium, potassium, rubidium or cesium salts are suitably employed in the process of the invention, the preferred alkali metal salts are the sodium salts or the potassium salts, particularly the sodium salts. The alkali metal salt is typically produced by dissolving the hydroxyaryl-substituted spirodilactam compound (formula I) and, if present, the di(hydroxyphenyl) compound (formula V) in a suitable reaction diluent and adding a slight stoichiometric excess of an alkali metal base, e.g., the hydroxide, carbonate or bicarbonate, while removing the water present or formed by conventional methods such as extraction or distillation. A preferred method of water removal is by azeotropic distillation with a portion of the reaction diluent. The N-alkylamides such as N,N-dimethylformamide or N-methyl-2-pyrrolidone are preferred diluents for the formation of alkali metal salts, particularly when employed with a second reaction diluent with which water forms an azeotrope, e.g., ethylbenzene, xylene or toluene. Subsequent to reaction with alkali metal base, the alkali metal salt(s) are recovered by conventional methods such as extraction or solvent removal but the salts are most frequently reacted in situ in the media of production without isolation. In the modification where terpolymer is to be produced, the alkali metal salt of the hydroxyaryl-substituted spirodilactam compound and the alkali metal salt of the di(hydroxyphenyl)propane compound are conveniently prepared by neutralization of a mixture of the two hydroxy-containing compounds. Alternatively, however, the alkali metal salts are produced separately and subsequently mixed.

The polymerization is conducted under polymerization conditions in the liquid phase in an inert reaction diluent. Preferred diluents are polar diluents and are capable of dissolving at least a portion of each reactant at polymerization temperature. In a particularly convenient reaction procedure, the polymerization diluent is the same as that diluent employed in alkali metal salt production but such is not required.

In the reaction mixture, no alkali metal salt of the di(hydroxyphenyl) compound is required since the presence of this third monomer is optional. However, when present, the alkali metal salt of the di(hydroxyphenyl) compound is present in a molar quantity relative to the molar quantity of the alkali metal salt of the hydroxyaryl-substituted spirodilactam compound, of from about 9:1 to about 1:9, but preferably in a molar ratio of from about 2:1 to about 1:2. The halo-substituted arylene compound with at least one electron-withdrawing substituent is employed in a molar ratio of from about 3:1 to about 1:3 with the total molar quantity of the alkali metal salt reactants. However, the arylene compound is preferably present in a substantially stoichiometric quantity, i.e., a molar ratio of halo-substituted arylene compound to total alkali metal salt reactants of substantially 1:1.

Polymerization takes place at an elevated temperature, typically from about 80° C. to about 250° C. but more often from about 100° C. to about 200° C. The polymerization reaction pressure is that which is sufficient to maintain the reaction mixture in a liquid phase. Such pressures are up to about 20 atmospheres, preferably up to about 10 atmospheres. During polymerization the reactant contact is maintained by conventional methods such as shaking, stirring or refluxing and subsequent to reaction the polymer product is recovered by well known techniques such as solvent removal, precipitation or extraction.

The polymer product is a linear alternating polymer wherein moieties derived from the halo-substituted arylene compound as by loss of the halogens, alternate with moieties of oxyaryl-substituted 1,6-diaza[4.4]-spirodilactam compound and, optionally, moieties of a di(4-oxyphenyl) compound. The moieties derived from the halo-substituted arylene compound are arylene moieties of from 1 to 2 aromatic rings, each of which has at least one electron-withdrawing substituent, where, if two rings are present, the rings are fused or joined by a link selected from a direct valence bond, alkylene of up to 8 carbon atoms inclusive, oxy, thio, sulfonyl, carbonyl, dioxyphenylene, 2,2-di(oxyphenyl)propane, di(oxyphenyl) sulfone or dioxydiphenylene.

When the polymer product is a copolymer having only moieties of the arylene compound and the substituted spirodilactam compound, the polymer includes those represented by the following repeating first segment formula

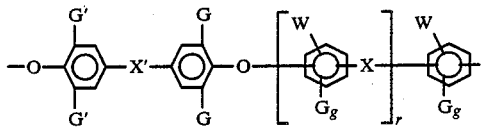

wherein G, G', g, r, W, X, X' and r have the previously stated meanings. Within the terpolymer chain, a plurality of segments of formula VI and a plurality of segments of formula VII are randomly found with the molar ratio of segments of formula VII to segments of formula VI being from about 9:1 to about 1:9, but preferably from about 4:1 to about 1:4. In general, the copolymers of the invention are preferred over corresponding terpolymers. In the case of such copolymers there will only be segments of formula VI in the polymer chain.

The nomenclature of the polymer product is not easily determined because of the complexity thereof. However, a representative copolymer has alternating units of 2-cyano-1,3-phenylene and 1,6-di(4-oxyphenyl)-1,6diazaspiro[4.4]nonane-2,7-dione illustratively produced by the reaction of 2,6-dichlorobenzonitrile and the sodium salt of 1,6-di(4-hydroxyphenyl)1,6-diazaspiro[4.4]nonane-2,7-dione. In a representative terpolymer, the terpolymer chain will additionally contain units of 2,2-di(4-oxyphenyl)propane when, for example, the sodium salt of 2,2-di(4-hydroxyphenyl)propane is additionally present in the polymerization reaction mixture. Other polymer products will be apparent from consideration of the above formulas for the reactants and the polymer product. Of particular interest are the copolymers and terpolymers of the invention having molecular weights from about 11,000 to about 100,000.

The novel polyaryl ethers of the invention are thermoplastic polymers characterized by relatively high glass transition temperatures, typically over 200° C. and often even higher. Thus the polymers are processed by the usual methods employed for thermoplastics but the resulting products are useful in applications where dimensional stability at elevated temperatures is desired. Among such applications are containers for use with food and drink and base parts for electric and electronic applications.

The invention is further illustrated by the following Illustrative Embodiments which should not be construed as limiting the invention.

ILLUSTRATIVE EMBODIMENT I

In a 500 ml round-bottom flask equipped with a mechanical stirrer and a nitrogen inlet were placed 16.9 g (0.05 ml) of 1,6-di(4-hydroxyphenyl)-1,6-diazaspiro[4.4-]nonane-2,7-dione, 8.6 g (0.05 mole) of 2,6-dichlorobenzonitrile, 7.0 g (0.05 mole) of anhydrous potassium carbonate, 50 ml of toluene and 100 ml of N,N-dimethylacetamide. The mixture was heated with stirring to

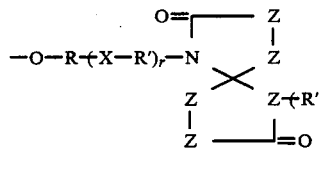

wherein R, R', r, X, Z, G, g and W have the previously stated meanings. In the modification wherein the polymer product is a terpolymer, the product additionally contains preferred second segments represented by the formula 130° C.–140° C. and water present or formed during reaction was removed by azetropic distillation. When water removal was complete, the temperature was raised to 150° C.–155° C. and maintained at that level with stirring for 12 hours. The resulting mixture was cooled and poured into methanol. The precipitated product was recovered by filtration crumbled, washed with 2 liters of hot water and then 2 liters of methanol and the product was then dried in a vacuum oven. The resulting polymer had a glass transition temperature of 254° C.

ILLUSTRATIVE EMBODIMENT II

In a 500 ml round-bottom flask equipped with a mechanical stirrer and a nitrogen inlet were placed 16.9 g (0.05 mole) of 1,6-di(4-hydroxyphenyl)-1,6-diazaspiro[4.4]nonane-2,7-dione, 8.6 g (0.05 mole) of 2,6-dichlorobenzonitrile, 7.0 g (0.05 mole) anhydrous potassium carbonate, 50 ml of toluene and 100 ml of N-methyl-2-pyrrolidone. The reaction mixture was heated to 160° C. and stirred until water was essentially completely removed from the mixture by azeotropic distillation. The reaction mixture was further heated at 160° C. until the mixture became viscous when 0.135 g (0.01 mole) of p-chlorobenzonitrile was added to stabilize polymer chain terminals. The resulting mixture was cooled and the solid polymer product was pulverized in water, washed twice with warm methanol, twice with warm water and again with methanol. The resulting polymer, upon drying, was a white polymer, 21.0 g, obtained in 96% yield.

The product had a glass transition temperature of 267° C. and the infrared and nuclear magnetic resonance spectra were consistent with an alternating polymer of 2-cyano-1,3-phenylene units and 1,6-di(4-oxyphenyl)-1,6-diazaspiro[4.4]nonane-2,7-dione units.

ILLUSTRATIVE EMBODIMENT III

From the polymer of Illustrative Embodiment II, a film was formed by a press molding at 320° C. The mechanical properties of this polymer film were as follows:

| Tensile Strength | 14,600 psi |
|---|---|
| Elongation at Break | 7% |
| Tensile Modulus | 405,000 psi |

These values were determined by a method based on ASTM D1708.

ILLUSTRATIVE EMBODIMENT IV

In a 5 liter round bottom flask equipped wIth a mechanical stirrer and a nitrogen inlet and outlet were placed 159.6 g (0.7 mole) of 2,2-di(4hydroxyphenyl)propane, 236.6 g (0.7 mole) of 1,6-di(4-hydroxyphenyl)-1,6diazaspiro[4.4]nonane-2,7-dione, 240.8 g (1.4 mole) of 2,6-dichlorobenzonitrile, 196 g (1.414 mole) of anhydrous potassium carbonate, 400 ml of toluene and 2 liters of N-methyl-2-pyrrolidone. The mixture was stirred while being heated to 160° C. and the water formed was removed by azeotropic distillation. The reaction mixture was maintained at 160° C. until the mixture became viscous at which time 1.93 g (0.014 mole) of p-chlorobenzonitrile was added to stabilize polymeric chain terminals. The resulting mixture was cooled and the solid polymer product was recovered by filtration, pulverized in water, washed twice with warm methanol, twice with warm water and once with methanol. The resulting polymer, upon drying, was a white solid and was obtained in a yield of 99%. The product had a glass transition temperature of 230° C. and the infrared and nuclear magnetic resonance spectra were consistent with the formula of a polymer wherein units of 2-cyano-1,3-phenylene alternate with units of 2,2-di(4-oxyphenyl)-propane or 1,6-di(4-oxyphenyl)-1,6-diazaspiro[4.4]nonane-2,3-dione.

ILLUSTRATIVE EMBODIMENT V

A sample of the polymer of Illustrative Embodiment IV was formed into a film by press molding at 280° C. The mechanical properties of this film were the following:

| Tensile Strength | 13,400 psi |
|---|---|
| Elongation at Break | 12% |
| Tensile Modulus | 303,000 psi |

These values were determined by a method based on ASTM D 1708.

What is claimed is:

1. A linear, alternating polymer ether polymer wherein (a) arylene moieties of up to 30 carbon atoms and from 1 to 2 aromatic rings, each of which aromatic rings has an electron-withdrawing substituent selected from cyano, nitro, nitroso or trifluoromethyl, and which, when two rings are present has the rings fused or linked by a direct bond or by alkylene of up to 8 carbon atoms inclusive, oxy, thio, carbonyl, sulfonyl, dioxyphenylene, 2,2-di(oxyphenyl)propane, di(oxyphenyl) sulfone or dioxydiphenylene, alternate with (b) 1,6-diaza [4.4]spirodilactam moieties having an oxyaryl substituents on each 1-and 6-spiro ring nitrogen atom, and (c) optionally with di(4-oxyphenyl) moieties.

2. The polymer of claim 1 having a repeating first segment represented by the formula VI

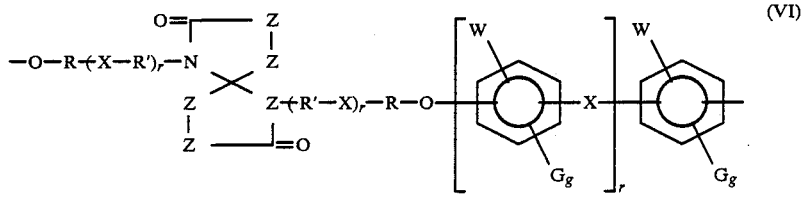

and optionally up to about 9 times the molar quantity of the first segment of a second segment of the formula VII

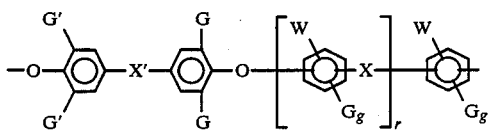 (VII)

wherein R is aromatic of up to 15 carbon atoms and up to 2 aromatic rings, inclusive; R' is R or aliphatic of up to 10 carbon atoms; each r is 0 or 1; Z independently is >C(Z')$_2$ in which Z' is hydrogen, lower alkyl, lower halo, or phenyl, or Z is such that two adjacent Z moieties taken together form a ring system Z'' of from 5 to 7 ring atoms, up to two of which are heteroatoms selected from nitrogen, oxygen or sulfur, with the remainder of the ring atoms being carbon atoms, there being up to 15 carbon atoms inclusive in each Z'', two of which form a bridge between the carbon atoms connected by the adjacent Z moieties; W is an electron-withdrawing group selected from cyano, nitro, nitroso or trifluoromethyl; G is lower alkyl; g is 0, 1 or 2, X is a direct valence bond, or X is alkylene of up to 8 carbon atoms inclusive, oxy, thio, sulfonyl, carbonyl, dioxyphenylene, 2,2-di(oxyphenyl)propane, di(oxyphenyl) sulfone or dioxydiphenylene, X' is a direct valence bond, or X' is alkylene of up to 8 carbon atoms inclusive, oxy, thio, sulfonyl or carbonyl, and G' independently is hydrogen, lower alkyl or middle halogen.

3. The polymer of claim 2 which is a copolymer.
4. The polymer of claim 3 wherein each r is zero.
5. The polymer of claim 4 wherein R is phenylene.
6. The polymer of claim 5 wherein each g is zero.
7. The polymer of claim 6 wherein each Z is >C(Z')$_2$.
8. The polymer of claim 7 wherein Z' is hydrogen or methyl.
9. The polymer of any one of claims 2, 3, 4, 5, 6, 7 or 8 wherein W is cyano.
10. The polymer of any one of claims 2, 3, 4, 5, 6, 7 or 8 wherein W is trifluoromethyl.
11. The polymer of claim 9 wherein R is p-phenylene and Z' is hydrogen.
12. The polymer of any one of claims 2, 3, 4, 5 or 6 wherein adjacent Z moieties are Z''.
13. The polymer of claim 12 wherein Z'' is benzo.
14. The polymer of claim 13 wherein W is cyano.
15. The polymer of claim 14 wherein R is p-phenylene.
16. The polymer of claim 2 which is a terpolymer.
17. The polymer of claim 16 wherein each r is zero.
18. The polymer of claim 17 wherein R is phenylene.
19. The polymer of claim 18 wherein each g is zero.
20. The polymer of claim 19 wherein G' is hydrogen.
21. The polymer of claim 20 wherein X' is 2,2-propylene.
22. The polymer of claim 21 wherein each Z is >C(Z')$_2$.
23. The polymer of claim 22 wherein Z' is hydrogen.
24. The polymer of any one of claims 2, 16, 17, 18, 19, 20, 21 or 23 wherein W is cyano.
25. The polymer of any one of claims 2, 16, 17, 18, 19, 20, 21 or 24 wherein W is trifluoromethyl.
26. The polymer of claim 25 wherein R is p-phenylene.
27. The polymer of any one of claims 16, 17, 18, 19, 20 or 21 wherein adjacent Z groups are Z''.
28. The polymer of claim 27 wherein Z'' is benzo.
29. The polymer of claim 28 wherein W is cyano.
30. The polymer of claim 29 wherein R is p-phenylene.
31. The polymer according to claims 2, 3 or 16 wherein the molar ratio of segments of formula VII to segments of formula VI are from about 4:1 to about 1:4.
32. An article molded from the polymer of any one of claims 1, 2, 3 or 6.
33. The article of claim 32 wherein the molded article is a film.

* * * * *